United States Patent [19]

Schwab

[11] 4,451,265
[45] May 29, 1984

[54] DIESEL FUEL-AQUEOUS ALCOHOL MICROEMULSIONS

[75] Inventor: Arthur W. Schwab, Peoria, Ill.

[73] Assignee: The United States of America as represented by the Secretary of Agriculture, Washington, D.C.

[21] Appl. No.: 256,206

[22] Filed: Apr. 21, 1981

[51] Int. Cl.$^3$ ............................................. C10L 1/32
[52] U.S. Cl. ........................................ 44/51; 44/50; 44/57; 252/356; 252/357
[58] Field of Search ............... 44/51, 57, 50; 252/356, 252/357

[56] References Cited

U.S. PATENT DOCUMENTS

| | | | |
|---|---|---|---|
| 2,280,830 | 4/1942 | Johnson | 252/356 |
| 2,603,557 | 7/1952 | Roush | 44/51 |
| 2,643,942 | 6/1953 | Barusch | 44/56 |
| 2,646,348 | 7/1953 | Neudeck | 44/56 |
| 3,346,494 | 10/1967 | Robbins et al. | 252/33.2 |
| 3,527,581 | 9/1970 | Brownawell et al. | 44/51 |
| 3,876,391 | 4/1975 | McCoy et al. | 44/51 |
| 4,083,698 | 4/1978 | Wenzel et al. | 44/51 |

OTHER PUBLICATIONS

P. A. Boruff et al., ASAE Paper No. 80-1523.
K. E. Wrage et al., ASAE/CSAE Paper No. 79-1052 (1979).
G. Gillberg et al., pp. 221-231 in J. T. Zung (ed.), Evaporation-Combustion of Fuels, Advances in Chemistry Series No. 166, ACS.
N. R. Iammartino, Chem. Eng. 24: 84-88 (Nov. 11, 1974).

Primary Examiner—Charles F. Warren
Assistant Examiner—Y. Harris-Smith
Attorney, Agent, or Firm—M. Howard Silverstein; David G. McConnell; Curtis P. Ribando

[57] ABSTRACT

Hybrid fuel microemulsions are prepared from diesel fuel, water, alcohol, and a novel surfactant system comprising N,N-dimethylethanolamine and a long-chain fatty acid substance. These fuels are characterized by high water tolerance and low-temperature stability, and are particularly adaptable to the utilization of aqueous ethanol as the alcohol source.

10 Claims, 1 Drawing Figure

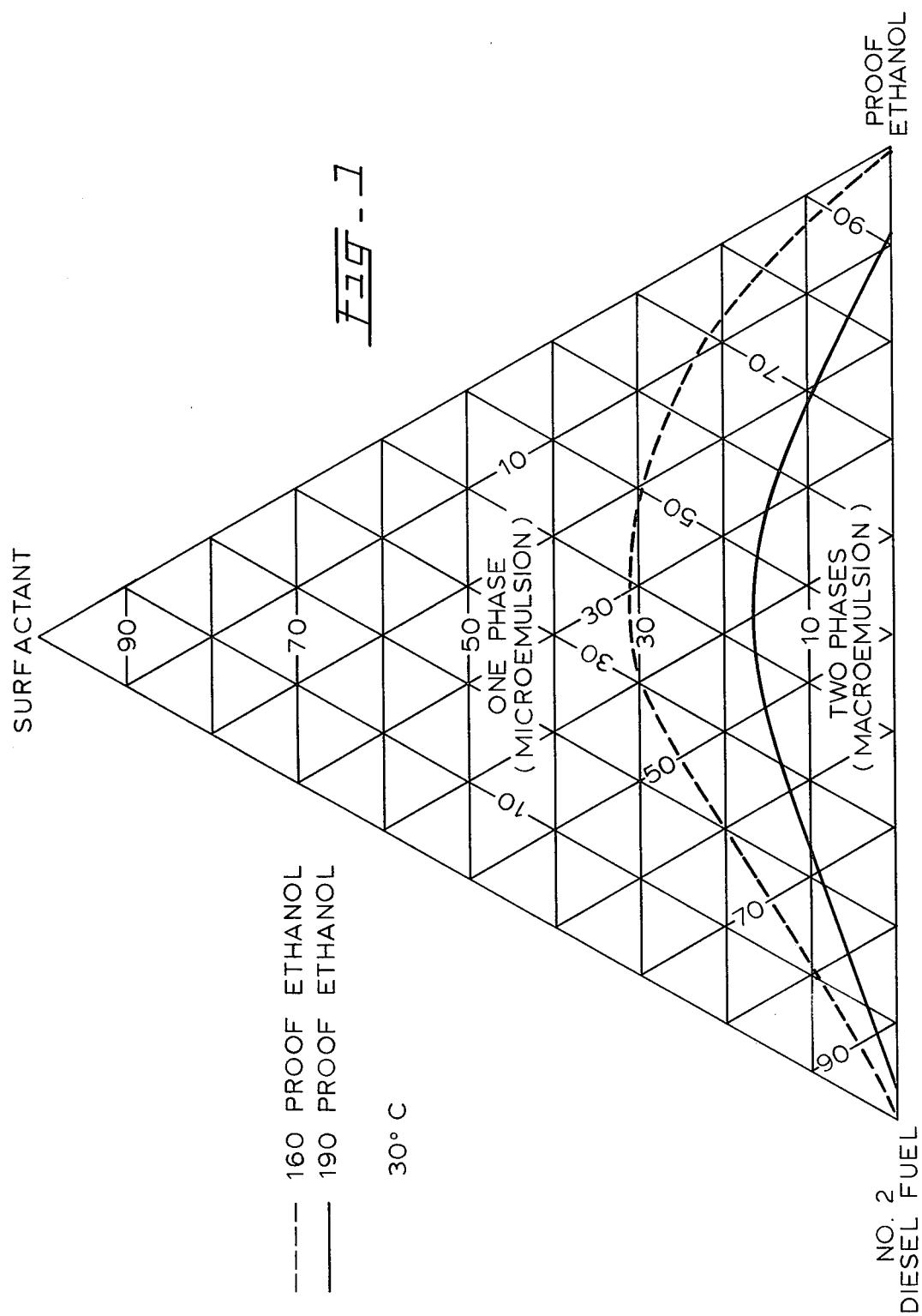

DIESEL FUEL-AQUEOUS ALCOHOL MICROEMULSIONS

BACKGROUND OF THE INVENTION

1. Field of the Invention

The energy crisis of recent years has stimulated research in the field of alternate and hybrid fuels. One area of particular interest relates to fuels for commercial and agricultural vehicles, which are typically powered by diesel engines. The potential of many farmers to generate their own alcohol has led to an intensive study of combining alcohol with diesel fuel. However, among the problems encountered by this combination are water intolerance, phase separation, undesirable rheological properties, and reduction of cetane levels. This invention relates to diesel fuel-alcohol blends and to a novel surfactant system for obviating the characteristic problems of prior art compositions.

2. Description of the Prior Art

For reasons of economics, availability, and combustion characteristics, ethanol has been given the most attention as a potential alcohol additive to conventional fuels. The feasibility and performance properties of diesel fuel-ethanol mixtures has been reported by Wrage et al. [Technical Feasibility of Diesohol, ASAE Paper 79-1052 (1979)]. As pointed out therein, the most critical problem associated with ethanol blends has been phase separation. Anhydrous ethanol and diesel oil are miscible at room temperature, but trace amounts of water in the mixture will cause a phase separation and movement of the ethanol and water to the top of the container. The water tolerance of blends decreases with decreasing temperature. At 0° C., a water concentration of only 0.05% will cause phase separation. Since this amount can readily be absorbed in the fuel during transport and storage, anhydrous ethanol-diesel oil blends tend to be impractical.

Accordingly, a preponderance of the research efforts on hybrid fuels has been aimed at increasing the water tolerance to not only allow for water absorption, but also to permit the use of aqueous alcohol. As opposed to anhydrous alcohol, the aqueous form having at least 5% water content is within the production capabilities of on-farm stills. Also, its recovery requires substantially less energy, and it is therefore less costly to produce. Moreover, it has been reported that when water is properly incorporated into a diesel fuel, it serves as a heat sink, thereby lowering combustion temperatures and reducing $NO_x$ and smoke emissions [G. Gillberg et al., Microemulsions as Diesel Fuels, pp. 221–231 in J. T. Zung (ed.), Evaporation-Combustion of Fuels. Advances in Chemistry Series No. 166, ACS]. This phenomenon is also discussed by N. R. Iammartino [Chem. Eng. 24: 84–88 Nov. 11, 1974)], D. W. Brownawell et al., U.S. Pat. No. 3,527,581, and E. C. Wenzel et al., U.S. Pat. No. 4,083,689.

The intimate admixture of water and oil results in either a macroemulsion or a microemulsion. Macroemulsions have dispersed particles with diameters in the 200 to 10,000 nm. range and are not stable, eventually separating into two phases. Microemulsions are transparent, thermodynamically stable colloidal dispersions in which the diameter of the dispersed-phase particles is less than one-fourth the wavelength of visible light. Considerably more surfactant is required to create a microemulsion than a macroemulsion since the volume of the interphase of a microemulsion is an appreciable percentage of the total volume of the dispersed sphere (the core plus the interphase).

Brownawell, supra, teaches the microemulsification of water in hydrocarbon fuels such as diesel fuel. By means of a balanced combination of surfactant types, he can emulsify up to 2 parts by weight of water per 1 part of surfactant. One of the types must be predominantly hydrocarbon-soluble and only moderately water-soluble and includes fatty acids of from 12 to 20 carbon atoms and higher alkyl phenols. The other type must be predominantly water-soluble and only moderately hydrocarbon-soluble and is exemplified by alkylene polyamines and alkanolamines. In like manner, McCoy et al. (U.S. Pat. No. 3,876,391) prepares microemulsions of hydrocarbon fuels and water by means of a multicomponent surfactant system. The petroleum-soluble component is an aliphatic ester of a polyol or a polyoxyalkylated alkyl phenol, while the water-soluble component is selected from a variety of known surfactants such as the fatty acid salts of polyalkanolamines, quaternary ammonium salts, and polyoxylated alkyl phenols. The teachings of both Brownawell and McCoy are insufficient to ascertain the effects on the microemulsion of adding lower alcohols or subjecting it to low temperatures.

In U.S. Pat. No. 3,346,494, Robbins et al. teaches the preparation of a hydrocarbon microemulsion with either water or methanol and a tricomponent microemulsifier system including a long-chain fatty acid or fatty acid mixture, an amino alcohol, and an alkyl polyoxylated phenol. Exemplary amino alcohols include ethanolamine, diethanolamine, and 2-amino-2-methyl-1-propanol. Robbins does not teach the simultaneous microemulsification of water with a lower alcohol, nor does he show preparing a microemulsion with a diesel fuel. Wenzel et al. (U.S. Pat. No. 4,083,698) prepares stable water-in-oil emulsions comprising (a) a hydrocarbon fuel, (b) water, (c) an alcohol, and (d) a combination of surface-active agents. Contemplated are diesel fuel emulsions wherein the alcohol is methanol, ethanol, or isopropanol. The combination of surface-active agents must include three components: (1) a long-chain fatty acid salt, or, more preferably, an ammonium or sodium long-chain fatty acid salt, or mixture thereof; (2) a free unsaturated long-chain fatty acid, or a mixture of a free unsaturated organic acid and a free saturated long-chain fatty acid; and (3) a nonionic surfactant typified by ethylene oxide condensation products and esterification products of a fatty acid with ethylene oxide. The lowest critical solution temperature obtained by Wenzel for a diesel fuel was $-10°$ C., and that was achieved only by the use of methanol as the alcohol and by the addition of a fourth component (a mixture of cyclohexanol and cyclohexanone). Since methanol is taught therein as providing the strongest micellar partition, the critical solution temperature for ethanol would expectedly be higher.

SUMMARY OF THE INVENTION

We have now developed a hybrid diesel fuel composition in which unexpectedly high levels of water and alcohol are held in a stable microemulsion at extremely low temperatures by means of a novel surfactant system prepared from two components. One of the components is N,N-dimethylethanolamine and the other is a long-chain fatty acid substance.

In accordance with this discovery, it is an object of the invention to enable hybridizing diesel fuel with relatively high levels of aqueous alcohol.

It is also an object of the invention to prepare diesel-alcohol fuels which exhibit high water tolerance.

Another object of the invention is to enhance the combustion properties of diesel fuel by incorporation of microemulsified water droplets.

A further object of the invention is to prepare microemulsions from diesel oil and relatively high levels of aqueous ethanol which are characterized by low viscosities, stability, and clarity at extremely low temperatures.

Finally, it is an object and advantage of the invention to accomplish the aforementioned objectives by means of a simple and universally applicable surfactant system.

Other objects and advantages of the invention will become readily apparent from the ensuing description.

BRIEF DESCRIPTION OF THE DRAWING

FIG. 1 is a ternary phase diagram at 30° C. for diesel fuel, ethanol, and the novel surfactant system at two ethanol:water ratios.

DETAILED DESCRIPTION OF THE INVENTION

The hybrid fuels of this invention have as their basic component any petroleum fraction meeting the ASTM specifications for diesel fuel. Of course depending on the fuel grade, the actual hydrocarbon mixture will vary. No. 2 diesel fuel is most commonly used in commercial and agricultural vehicles, and therefore was selected as the basis for the formulations set forth in the examples below, with the understanding that other grades are within the scope of the invention.

The alcohols contemplated for hybridizing with the diesel fuel are the lower water-miscible alcohols having from 1 to 3 carbon atoms. Preferred is ethanol for reasons of its combustion properties and availability. Of course, the advantages of the invention are best realized by employing the alcohol in aqueous form. Particularly preferred are aqueous ethanol solutions in which the water content ranges from 5–30%, corresponding to an ethyl alcohol:water volumetric ratio in the range of 19:1 to 7:3, respectively.

The novel surfactant system consists essentially of the reaction product of (1) N,N-dimethylethanolamine (DMEA) and (2) a long-chain fatty acid substance selected from the group of monocarboxylic acids having a chain length of $C_9$–$C_{22}$ and mixtures thereof. Illustrative fatty acids include pelargonic, oleic, linoleic, linolenic, erucic, and the free acid mixtures derived from natural triglyceride oils such as soybean, tall, safflower, sunflower, linseed, cottonseed, corn, and rapeseed. For fuel mixtures designed for winter use, it is desirable to avoid or at least minimize the saturated component content. Soy fatty acids are readily available and have proven to be effective. However, for winter fuels, the level of saturates (myristic, palmitic, and stearic acids) therein should be reduced to less than about 5%. Suitable molar ratios of DMEA:fatty acid substance are in the range of about 2:1 to 1:2, with 1:1 being preferred. Volmetrically, a 1:1 molar ratio of amine:soy acids would translate to approximately 1:3.

The relative proportions of diesel fuel, alcohol, water, and surfactant system are of course dependent on the properties desired in the final fuel composition. Certain limitations to these properties are set by physical phenomena such as phase separation, while others are set by engine performance standards, including for example, cetane number, viscosity, power output, brake thermal efficiency, and the like. In most cases, if the hybrid fuel is a stable microemulsion and meets the minimum criteria for water content, cetane number, and viscosity, it will be acceptable on other grounds as well. In order for the microemulsified water to have a noticeable impact on the fuel's combustion properties, it should be incorporated at a level of at least about 0.1%. This level can be achieved for example by the addition of 2% of 95% aqueous alcohol or 0.5% of 80% aqueous alcohol. The minimum ASTM cetane value for No. 2 diesel oil is 40, though fuel formulations in accordance with this invention having cetane values as low as about 30 perform remarkably well in engine tests. This is presumably attributable to the presence of the water. For purposes of the invention, the lower limit on cetane has therefore been set at 30.

When the alcohol is ethanol, compositions included within the scope of this invention would have a diesel fuel concentration in the range of about 34% to about 99%, ethanol in the range of about 0.5% to about 42%, water in the range of 0.1% to about 6%, and surfactant system in the range of about 0.5% to about 58%, all based upon the total volume of the formulation. Compositions intended for winter use would differ from the above formulation only in that the upper limit on the ethanol would be about 20% and that on the water would be about 4%. In operating within the confines of these parameters, the properties of the hybrid fuels can be tailored to satisfy a multitude of conditions. For example, as the proportion of diesel fuel to water and/or ethanol is increased, the cetane number increases. As the relative amount of water to ethanol decreases, the viscosity also decreases, particularly at the higher ratios of diesel oil to alcohol. Overall, the compositions which can be formulated within the scope of the aforementioned parameters will have viscosities within the range of about 2 to 8 centistokes (cSt.) at 37.8° C. Also, as the ratio of water:ethanol decreases, the tolerance of the system to phase separation increases, thereby either permitting the use of less surfactant, or allowing the ratio of ethanol to diesel oil to be increased. In the most preferred formulations, the level of diesel fuel is at least 65%, the amount of surfactant is selected to promote and maintain a thermodynamically stable microemulsion at a predetermined temperature, and the ethanol and water components in the aforementioned proportions make up the remainder. Such compositions will be characterized by cetane numbers of at least about 32 and kinematic viscosities in the range of 2–6 cSt. By proper selection of surfactant level, they can be readily formulated to have critical solution temperatures down to about −18° C.

For the purpose of illustrating those formulations which will form microemulsions, FIG. 1 depicts ternary diagrams for ethanol:water ratios of 19:1 (190 proof) and 8:2 (160 proof), which correspond to 95% and 80% aqueous ethanol, respectively. The surfactant system comprises DMEA and a commercial soybean oil fatty acid fraction ("Emersol 315") in a 1.05:1 molar ratio. At 30° C., the formulations above the curves will exist as one visible phase thermodynamically stable microemulsions, while those below the curves will be unstable and have two visible immiscible phases. The area above the curve varies directly with both the ethanol:water ratio and the specified temperature level. That is, as either the relative amount of water increases, or the specified temperature decreases, the area above the curve decreases. Fuels formulated within the aforementioned ranges must of course also come within the microemulsion region of the appropriate diagram for a predetermined temperature specification, as readily ascertainable by a person of ordinary skill in the art.

The order of mixing the fuel constituents is not particularly critical, and the components of the surfactant system may be individually added or prereacted and added in the form of the DMEA fatty acid soap. In the preferred embodiment, the DMEA is premixed with the aqueous alcohol, and the fatty acid substance is premixed with the diesel fuel, whereby the surfactant components will react in situ upon combination of the premixes. Any conventional means of simple agitation such as gentle stirring or shaking is sufficient to form the microemulsion, without the need for elaborate equipment. Upon mixing, an exothermic reaction is spontaneously initiated. While not desiring to be bound to any particular theory of operation, it is believed that the DMEA and the carboxylate moiety of the fatty acid react with one another and with the alcohol to form a thermodynamically stable micellar system. The actual physical structure of micelles is unknown. However, in the context of the present system, it can be thought of as constituting an interphase separating microscopic water droplets in the discontinuous phase from the diesel fuel in the continuous phase. It would appear from the experimental data that the micelles of the microemulsion have an unprecedented level of water penetration, suggesting a unique micellar structure imparted by the surfactant system. These microemulsions have the appearance of a single, visually clear, homogeneous phase.

The following examples are intended only to further illustrate the invention and are not intended to limit the scope of the invention which is defined by the claims.

EXAMPLE 1

Into a sample vial were pipetted the following components:

| Component | Composition by volume | |
|---|---|---|
| | Parts (ml.) | Percentage |
| No. 2 diesel fuel | 8 | 66.7 |
| 95% ethanol | 2 | 16.7 |
| soybean acids | 1.5 | 12.5 |
| DMEA | 0.5 | 4.1 |

The diesel fuel was No. 2 commercial grade with a distillation range of 205°–325° C. The DMEA distilled at 138°–139° C. and the soybean acids were "Emersol 315" grade having an analysis of 62% linoleic, 24% oleic, 7.6% linolenic, 4% palmitic, 0.5% stearic, and 0.5% myristic acids. The molar ratio of DMEA:soybean acids was 1.05:1 and the percentage of water by volume was 0.9%. Upon gently shaking the sample vial, the mixture immediately formed a clear, homogeneous microemulsion with noticeable liberation of heat. The kinematic viscosity was 3.7 cSt. at 37.8° C., the density at 20° C. was 0.8321 g./cm$^3$, and the critical solution temperature was approximately −18° C.

EXAMPLE 2

A. Fuel Preparation. The procedure of Example 1 was repeated on a larger scale except that the "Emersol 315" was first premixed with the diesel fuel and the DMEA was premixed with the 95% ethanol. The premixes were then combined and mixed thoroughly.

B. Physical Properties. The physical and combustion properties of the hybrid fuel prepared above in Example 2A were compared to those for the No. 2 diesel fuel alone.

The gross heat of combustion of the No. 2 diesel fuel was measured using an API hydrometer. The heat of combustion of the blended fuel was calculated from the heats of combustion of the components. Values for the gross heat of combustion used in the calculation were: "Emersol 315," 33,700 kJ./kg.; DMEA, 32,200 kJ./kg.; and anhydrous ethanol, 29,700 kJ./kg.

The chemical formulas used in calculating stoichiometric air-to-fuel ratios were: diesel fuel, $C_{16}H_{34}$; anhydrous ethanol, $C_2H_6O$; "Emersol 315, "$C_{18}H_{32}O_2$; DMEA, $C_4H_{11}NO$; and water, $H_2O$.

Kinematic viscosities were measured with Cannon-Fenske calibrated viscometers using the procedure given in ASTM Standard D445-74 (ASTM, 1974). A model S precision kinematic viscosity bath manufactured by Precision Scientific Company was used to maintain the fuel samples at 37.8° C. The comparative volatility of the two fuels is indicated by the distillation characteristics. There was a noticeable difference between the two fuels for the first 30% distilled, with the hybrid showing greater volatility, after which both curves were nearly coincident. These properties are reported in Table I below. The additional properties listed in the table for the microemulsion were also experimentally determined, while those for No. 2 diesel oil represent the SAE limits. While certain properties of the hybrid fuel did not conform to SAE specifications, they are not necessarily detrimental to the performance or acceptability of the fuel.

TABLE I

Fuel Properties

| Property | Fuel | |
|---|---|---|
| | Micro-emulsion | No. 2 diesel[a] oil |
| Gross heat of combustion, kJ./kg. | 40,836 | 45,300 |
| Stoichiometric air-to-fuel ratio | 13.37 | 15.00 |
| Kinematic viscosity at 38° C., mm.$^2$/s. | 3.698 | 2,460 |
| Distillation range, °C. | 78–343 | 197–343 |
| Distillation range for first 30%, °C. | 78–230 | 197–242 |
| Flash point (Pensky Martens), °C. | 15.6 | 52 min. |
| Water and sediment, % by volume | trace | 0.05 max. |
| Carbon residue at 10% residuum, % | 2.09 | 0.35 max. |
| Ash, weight % | 0.35 | 0.01 max. |
| Sulphur, % by weight | 0.09 | 0.5 max. |
| Copper corrosion | No. 1a[b] | No. 3 |
| Cetane rating | 32.9 | 40 min. |
| Existent gum (steam jet), mg./100 ml. | | |
| Before heptane washing[c] | 1520.9 | —[d] |
| After heptane washing[c] | 14.6 | —[d] |

[a]Values indicated as min. or max. were not measured but are SAE limits for No. 2 diesel fuel. It can be safely assumed that the No. 2 diesel fuel used in the experiments met these limits.
[b]Value of 1a indicates less corrosion than the allowable SAE limit (No. 3) for No. 2 diesel fuel.
[c]Heptane washing removes nonvolatile materials that do not form harmful gum but remain as residues in the gum test.
[d]No SAE limit has been set for this property.

For example, while the cetane rating was 7.1 points below the SAE minimum, there were no apparent ill effects on the performance of the warm engine. Potential problems which might be encountered under conditions of a cold start could be readily avoided by the addition of cetane improvers, as well known in the art. Similarly, the substandard flash point has no significance in engine operation, but is related to safety regulations. The flash point is in fact well above that for all gasolines, and therefore special problems in handling would not be anticipated.

Finally, it is noteworthy that the negligible amount of water and sediment in the hybrid fuel is indicative of the microemulsion stability. The assay employs a centrifugation step which has no apparent effect on the 0.9% dispersed phase.

C. Engine Tests. The performance of the microemulsion fuel prepared in Example 2A above as compared to that of No. 2 diesel fuel was evaluated in a Ford 2000 naturally aspirated, direct-injection diesel engine. The three-cylinder engine had a displacement of 2.589 L and a compression ratio of 16.5:1. The high idle and governor's maximum speeds for the Nebraska test of the engine were 2,259 r.p.m. and 2,000 r.p.m., respectively. The engine used a C.A.V. distributor-type injector pump with injection timing set at 19° before head dead center. To avoid vapor bubble buildup in the injector return line, it was disconnected from the fuel filter and routed to a storage container.

The engine load was provided by a Midwest Dynamatic type 768 eddy-current dynamometer rated at 37.3 kW. The engine speed was measured with a Standard chronotachometer. Fuel consumption was measured with a Cox series 12 model 120-200 viscous drag flowmeter. Air was supplied to the engine through an orifice meter connected to a double surge tank. A calibrated, inclined manometer permitted measurement of the pressure drop across the orifice. The double surge tank included a boost fan to maintain atmospheric pressure at the inlet of the engine. Thermocouples with digital readouts were used to measure engine coolant temperature and exhaust gas temperature. A Bosch model EFAW 68A smoke meter was used to measure exhaust smoke, and a Sun model EPA-75 analyzer was used to measure carbon monoxide and unburned hydrocarbon concentrations in the exhaust gas. The fuel flowmeter produced readings as a function of viscous drag, and therefore was calibrated for each fuel based upon viscosity.

The procedure used was similar for all of the engine tests. The engine was started and allowed to run until the coolant had warmed to the controlled setting of the heat exchanger before any data were collected. It was desired that the high idle speed be the same for each of the tests, but the governor had to be reset each time because the fuel type affected the high idle speed. The actual high idle speeds used were 2,240 r.p.m. and 2,250 r.p.m., respectively, for the No. 2 diesel fuel, and the microemulsion. Data were recorded for a series of increasing loads in the governor-controlled range and at one point in the load-controlled range. At each load, the exhaust temperature was allowed to stabilize before data were recorded. At each load, data were obtained on the torque, speed, fuel-flow rate, airflow rate, exhaust and coolant temperatures, exhaust smoke number, and concentrations of carbon monoxide and unburned hydrocarbons in the exhaust gas. For all tests, the air temperature was 31.7° C. and the barometric pressure was 99.0 kpa.

The engine performance properties are set forth in Table II below. The net flow rate of each fuel was calculated as the difference between the gross fuel-flow rate and the bypass flow rate. There was no significant difference between the two fuels. Equivalence ratios were determined by dividing the stoichiometric air-to-fuel ratio (Table I) by the actual air-to-fuel ratio. Higher equivalence ratios thus correspond to richer mixtures. All of the mixtures were leaner than the stoichiometric ratio, as is typically the case for diesel engines. Coolant and exhaust temperatures and the composition of the exhaust gases were also observed.

TABLE II

Engine Performance Data

| Speed (r.p.m.) | Torque (N · m.) | Power (kW.) | Net fuel (kg./hr.) | Air flow (kg./hr.) | Air/fuel ratio | Equivalence ratio* | Exhaust temp. (°C.) | Coolant temp. (°C.)* | CO (%)* | Unburned hydrocarbons (p.p.m.)* | Bosch smoke No.* | Brake thermal efficiency (%)* |
|---|---|---|---|---|---|---|---|---|---|---|---|---|
| Microemulsion Fuel ||||||||||||| 
| 2250 | 0.0 | 0.00 | 0.99 | 164.8 | 166 | 0.080 | 212 | 89.4 | 0.08 | 59 | 0.0 | 0.0 |
| 2160 | 23.7 | 5.37 | 2.09 | 159.9 | 76.5 | 0.175 | 243 | 85.8 | 0.11 | 68 | 0.0 | 22.7 |
| 2132 | 47.5 | 10.60 | 2.86 | 156.8 | 54.8 | 0.244 | 281 | 88.6 | 0.08 | 65 | 0.0 | 32.7 |
| 2108 | 71.2 | 15.72 | 4.03 | 154.1 | 38.2 | 0.350 | 327 | 91.1 | 0.06 | 70 | 0.1 | 34.4 |
| 2076 | 94.9 | 20.64 | 4.93 | 150.2 | 30.5 | 0.438 | 383 | 90.3 | 0.05 | 75 | 0.0 | 36.9 |
| 2048 | 118.7 | 25.45 | 6.03 | 145.9 | 24.2 | 0.552 | 453 | 88.3 | 0.05 | 80 | 0.6 | 37.2 |
| No. 2 Diesel Fuel ||||||||||||| 
| 2240 | 0.0 | 0.00 | 1.54 | 163.6 | 106.5 | 0.141 | 198 | 88.1 | 0.06 | 110 | 0.3 | 0.0 |
| 2158 | 23.7 | 5.36 | 1.96 | 158.7 | 81.1 | 0.185 | 236 | 84.7 | 0.05 | 85 | 1.0 | 21.7 |
| 2120 | 47.5 | 10.54 | 2.92 | 156.5 | 53.7 | 0.279 | 283 | 72.5 | 0.06 | 70 | 1.1 | 28.7 |
| 2082 | 71.2 | 15.53 | 3.74 | 154.7 | 41.4 | 0.362 | 333 | 71.7 | 0.07 | 60 | 1.2 | 33.0 |
| 2060 | 94.9 | 20.48 | 4.70 | 150.2 | 32.0 | 0.469 | 403 | 85.0 | 0.09 | 59 | 1.9 | 34.6 |
| 2025 | 118.7 | 25.17 | 5.66 | 146.7 | 25.9 | 0.579 | 472 | 73.1 | 0.16 | 59 | 2.0 | 35.3 |

*For these properties there is an apparent statistically significant difference in values attributable to fuel type.

Carbon monoxide levels at full power were less with the hybrid fuel than with the diesel. This can be accounted for by the availability of the oxygen in the alcohol for oxidizing CO to $CO_2$. At low power, the level of unburned hydrocarbons from the hybrid is substantially less than from the diesel. At full power, the hybrid exhaust has a somewhat higher level of unburned hydrocarbons, presumably due to a slightly lower combustion temperature. Significantly less exhaust smoke was observed for the hybrid at all levels of power. Again it is surmised that oxygen in the alcohol accounts for more complete combustion of the fuel.

Finally, the brake thermal efficiency over most of the power range was higher for the hybrid than for the diesel fuel. At maximum power, the difference was 4-5%, which at least partially compensates for the hybrid's reduced heat content.

EXAMPLE 3

A series of No. 2 diesel fuel microemulsions from each of 80% aqueous ethanol and 95% aqueous ethanol was prepared at various levels of surfactant system consisting of a 3:1 volumetric ratio of soybean acids:DMEA. The diesel fuel was No. 2 commercial grade with a distillation range of 205°–325° C., the DMEA distilled at 138°–139° C., and the soybean acids were "Emersol 315." The microemulsions were prepared by volmetrically pipetting into a sample vial 8 ml. diesel fuel, 2 ml. of aqueous ethanol, and the desired amount of soybean oil and DMEA in the predetermined ratio. The vial was shaken gently to promote mixing and sufficient time was allowed for equilibration. In each case, the resultant hybrid fuel was visually clear and homogeneous. The effect of surfactant level on the microemulsion viscosity was thereafter ascertained by determining the average kinematic viscosity for each sample based upon five to six replicate measurements. The results are reported below in Table III.

TABLE III

Effect of Surfactant on Viscosity

| Volume SBO acids (ml.) | Volume DMEA (ml.) | Total surfactant concentration (%) | Kinematic viscosity at 37.8° C. (cSt.) | |
|---|---|---|---|---|
| | | | 80% EtOH | 95% EtOH |
| 0.75 | 0.25 | 9.09 | — | 3.020 |
| 1.00 | 0.33 | 11.74 | 3.965 | 3.005 |
| 1.25 | 0.42 | 14.31 | 4.219 | 3.167 |
| 1.38 | 0.46 | 15.54 | 4.481 | — |
| 1.75 | 0.58 | 18.90 | 5.499 | — |
| 2.00 | 0.67 | 21.07 | 5.400 | — |
| 2.25 | 0.75 | 23.08 | 5.568 | 4.000 |
| 3.00 | 1.00 | 28.57 | 6.127 | 4.347 |
| 3.75 | 1.25 | 33.33 | 6.807 | 4.913 |

EXAMPLE 4

A series of microemulsions having varying water contents were prepared by volumetrically pipetting the following reagents into a sample vial:
  No. 2 diesel fuel: 27.0 ml.
  absolute ethanol: 4.5 ml.
  soybean acids: 6.75 ml.
  DMEA: 2.25 ml.
  water The diesel fuel was No. 2 commercial grade with a distillation range of 205°–325° C. The absolute ethanol was commercial grade distilled over anhydrous calcium oxide and having a purity prior to use of 99.1% as checked by Karl Fisher titration. The DMEA distilled at 138°–139° C. and the soybean oil acids were "Emersol 315." The molar ratio of DMEA:soybean acids was approximately 1.08 and the volumetric ratio of diesel fuel to ethanol was approximately 6:1. Water was added in 0.05 to 0.10 ml. increments, and after each addition the vial was shaken gently to promote mixing. Sufficient time was allowed for each system to equilibrate and the critical solution temperatures were measured. These were determined using 35 ml. of formulation in a jacketed bath cooled at a reproducible rate of approximately 1.8° C. per minute. Stirring was accomplished by a "Teflon" magnet and temperature readings were made with an ASTM thermometer graduated in 0.5° divisions. The temperature at which turbidity suddenly appeared was recorded as the critical solution temperature. Above the critical solution temperature, all samples existed as visually clear, homogeneous microemulsions.

For purposes of comparison, the above experiment was repeated substituting 2-amino-2-methyl-1-propanol (AMP) having 99% purity for the DMEA. The results are reported in Table IV below. It is readily apparent that while the two amino compounds have the same empirical formula, the formulations incorporating the DMEA will tolerate substantially more water at low temperatures than those prepared from the AMP.

TABLE IV

Effect of Water on Critical Solution Temperature

| Added water (ml.) | Total water content (% by volume)* | Total water plus EtOH content (%) | Critical solution temperature (°C.) | |
|---|---|---|---|---|
| | | | DMA | AMP |
| 0.00 | 0.100 | 11.1 | −15.4 | −14.0 |
| 0.10 | 0.346 | 11.3 | −15.3 | −14.2 |
| 0.20 | 0.591 | 11.5 | −15.6 | — |
| 0.21 | 0.616 | 11.6 | — | −13.6 |
| 0.30 | 0.835 | 11.8 | −15.5 | −13.6 |
| 0.40 | 1.08 | 12.0 | −15.6 | −13.4 |
| 0.50 | 1.32 | 12.2 | −15.6 | −5.83 |
| 0.55 | 1.44 | 12.3 | −15.6 | −1.11 |
| 0.60 | 1.56 | 12.4 | −15.5 | 3.78 |
| 0.65 | 1.68 | 12.5 | −15.6 | 7.22 |
| 0.70 | 1.80 | 12.6 | −15.6 | 11.7 |
| 0.75 | 1.92 | 12.7 | −15.6 | 14.6 |
| 0.80 | 2.04 | 12.8 | −15.7 | 17.8 |
| 0.85 | 2.16 | 12.9 | −15.8 | 21.7 |
| 0.90 | 2.27 | 13.0 | −12.2 | 24.8 |
| 0.95 | 2.39 | 13.1 | — | 27.7 |
| 0.96 | 2.42 | 13.2 | −6.67 | — |
| 1.00 | 2.51 | 13.3 | −0.72 | 31.1 |
| 1.05 | 2.63 | 13.4 | 3.89 | |
| 1.10 | 2.74 | 13.5 | 10.3 | |
| 1.15 | 2.86 | 13.6 | 11.5 | |
| 1.20 | 2.98 | 13.7 | 15.8 | |
| 1.25 | 3.09 | 13.8 | 20.6 | |
| 1.30 | 3.21 | 13.9 | 24.4 | |
| 1.35 | 3.33 | 14.0 | 26.4 | |

*Including the water in the absolute EtOH (0.009%).

EXAMPLE 5

The procedure of Example 4 was repeated except that 0.24 ml. of water was added, which is the amount approximately equivalent to that contained in 95% aqueous ethanol at the same 6:1 diesel fuel-absolute ethanol ratio. Adjusting for the water in the absolute ethanol, the composition of the formulation was as follows:

| | ml. | % by volume | % by volume normalized for 0% $H_2O$ |
|---|---|---|---|
| diesel fuel | 27 | 66.3 | 66.8 |
| ethanol | 4.46 | 10.9 | 11.0 |
| soybean acids | 6.75 | 16.6 | 16.7 |
| DMEA | 2.25 | 5.5 | 5.5 |
| water | 0.28 | 0.7 | |
| Total | 40.74 | 100.0 | 100.0 |

The actual aqueous ethanol equivalent was calculated to be 94.1%

$$\left( \frac{4.46}{4.46 + 0.28} \times 100 \right).$$

Upon gentle shaking at room temperature, the mixture immediately formed a visually clear microemulsion with noticeable liberation of heat. The kinematic viscosity of the microemulsion at 37.8° C. was determined to be 4.786 cSt.

EXAMPLE 6

The procedure of Example 4 was repeated wherein the quantity of water added was 0.85 ml. This is approximately the maximum amount which can be tolerated at a critical solution temperature of $-16°$ C. when the diesel fuel:absolute ethanol ratio is 6:1. Adjusting for the water in the absolute ethanol, the composition of the formulation was as follows:

|  | ml. | % by volume | % by volume normalized for 0% H$_2$O |
|---|---|---|---|
| diesel fuel | 27 | 65.3 | 66.8 |
| ethanol | 4.46 | 10.8 | 11.0 |
| soybean acids | 6.75 | 16.3 | 16.7 |
| DMEA | 2.25 | 5.4 | 5.5 |
| water | 0.89 | 2.2 | |
| Total | 41.35 | 100.0 | 100.0 |

The actual aqueous ethanol equivalent was calculated to be 83.4%

$$\left( \frac{4.46}{4.46 + 0.89} \times 100 \right).$$

Upon gentle shaking at room temperature, the mixture immediately formed a visually clear microemulsion with noticeable liberation of heat.

It is understood that the foregoing detailed description is given merely by way of illustration and that modification and variations may be made therein without departing from the spirit and scope of the invention.

I claim:

1. A hybrid fuel composition comprising:
   (a) a diesel fuel;
   (b) a lower ($C_1$–$C_3$) alcohol;
   (c) water; and
   (d) a surfactant system comprising the reaction product of N,N-dimethylethanol amine and a long-chain fatty acid substance selected from the group of monocarboxylic acids having a chain length of $C_9$–$C_{22}$ and mixtures thereof in an amine:fatty acid substance molar ratio of about 2:1 to 1:2,
   wherein said surfactant system is present in the fuel composition in an amount effective for said composition to exist as a thermodynamically stable microemulsion.

2. A hybrid fuel composition as described in claim 1 wherein said diesel fuel is No. 2 diesel fuel.

3. A hybrid fuel composition as described in claim 1 wherein said lower alcohol is ethanol.

4. A hybrid fuel composition as described in claim 1 wherein said fatty acid substance in the surfactant system is a soybean acid fraction and the molar ratio of said fraction to N,N-dimethylethanolamine is approximately 1:1.

5. A hybrid fuel composition comprising:
   (a) No. 2 diesel fuel;
   (b) ethanol;
   (c) water; and
   (d) a surfactant system comprising the reaction product of N,N-dimethylethanolamine and a soybean acid fraction in a molar ratio of approximately 1:1;
   wherein, on a volmetric basis, the amount of water is in the range of 0.1% to about 6%, the amount of ethanol is in the range of about 0.4 to about 42%, the ratio of ethanol:water is in the range of 19:1 to 7:3, the amount of diesel fuel is in the range of about 34% to about 99%, and the surfactant system is present in an amount effective for said composition to exist as a thermodynamically stable microemulsion at a predetermined temperature.

6. A hybrid fuel composition as described in claim 5 wherein the ratio of ethanol:water is about 19:1.

7. A hybrid fuel composition as described in claim 5 wherein the amount of diesel fuel is in the range of 65% to 99%.

8. A hybrid fuel composition as described in claim 5 wherein said soybean acid fraction comprises less than about 5% saturated fatty acids, the amount of water is in the range of 0.1 to about 4%, and the amount of ethanol is in the range of about 0.4 to about 20%.

9. A hybrid fuel composition as described in claim 8 wherein the ratio of ethanol:water is about 19:1.

10. A hybrid fuel composition as described in claim 8 wherein the amount of diesel fuel is in the range of 65% to 99%.

* * * * *